United States Patent [19]
Alexeff

[11] 3,796,362
[45] Mar. 12, 1974

[54] BATCH-OFF STORAGE FESTOON

[76] Inventor: Alexander V. Alexeff, 14105 Hazelmere Ave., Cleveland, Ohio 44111

[22] Filed: Oct. 2, 1972

[21] Appl. No.: 294,348

[52] U.S. Cl. ............................................. 226/104
[51] Int. Cl. .................................................... B65h
[58] Field of Search ............ 226/104, 105, 106, 107

[56] References Cited
UNITED STATES PATENTS

| | | | |
|---|---|---|---|
| 3,536,240 | 10/1970 | Korsch | 226/104 X |
| 2,295,060 | 9/1942 | Stalder | 226/106 |
| 3,346,096 | 10/1967 | Johnson | 226/105 |
| 2,988,255 | 6/1961 | Colker | 226/104 |
| 2,552,620 | 1/1971 | Neubeck | 226/105 |
| 2,570,172 | 10/1951 | Von Kohorn | 226/104 |

FOREIGN PATENTS OR APPLICATIONS

| | | | |
|---|---|---|---|
| 608,824 | 4/1933 | Germany | 226/104 |

Primary Examiner—Allen N. Knowles
Attorney, Agent, or Firm—Donnelly, Maky, Renner & Otto

[57] ABSTRACT

Moving storage festoons consist of multiple storage racks each including two or more storage bars fixed relative to each other, with successive storage racks pivotally connected together permitting movement of the storage racks in a continuous looped path. The storage racks are supported on guide rails by bearings or wheels and require very little force to move the storage racks, permitting a pusher-type drive system to be used to push the racks along the guide rails. A pressure roll may also be used to press the rubber material against projections on the storage bars thereby preventing slippage.

16 Claims, 12 Drawing Figures

PATENTED MAR 12 1974

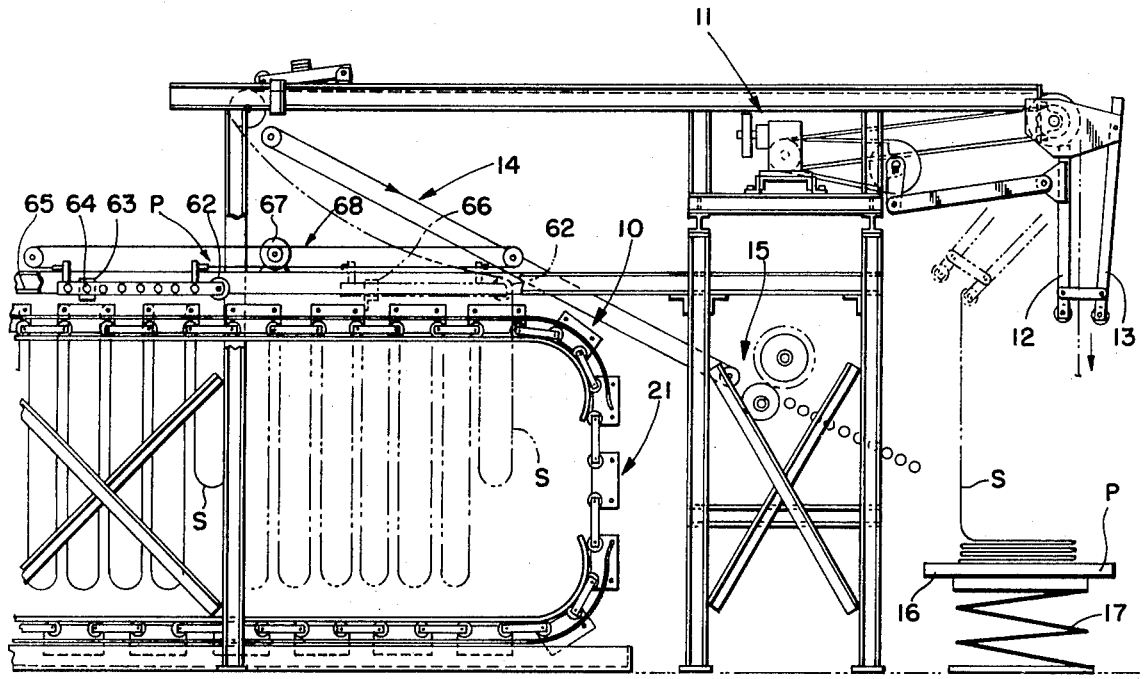
FIG. 1C
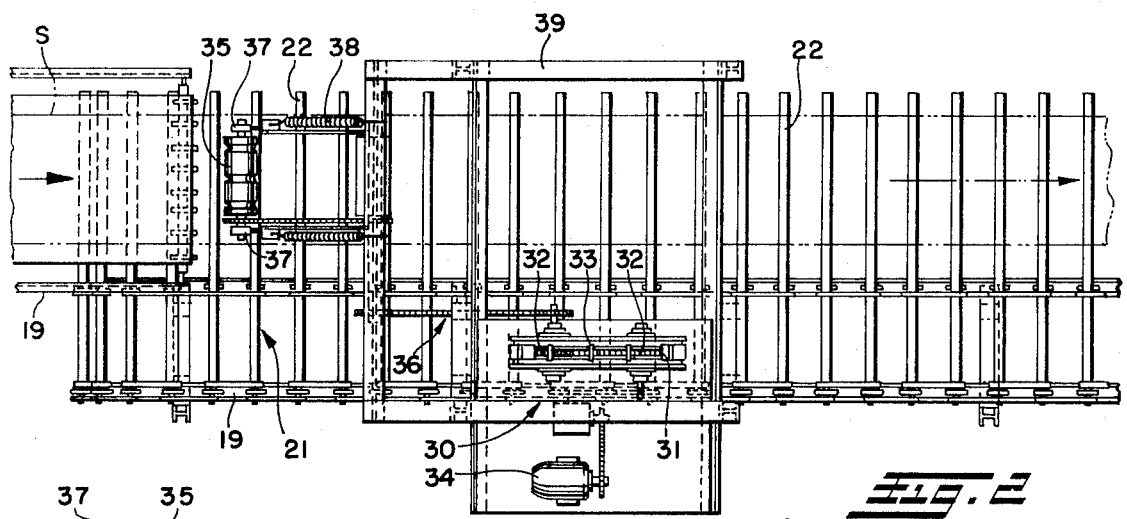
FIG. 2
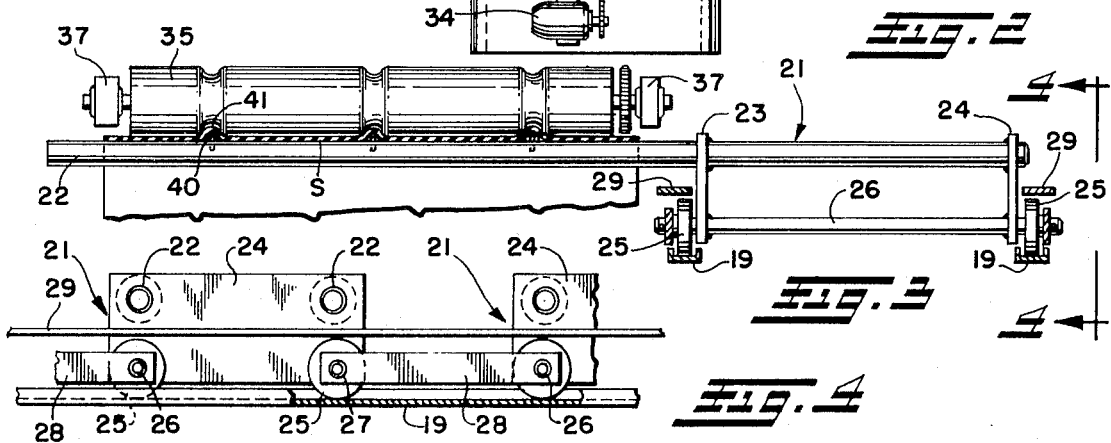
FIG. 3
FIG. 4

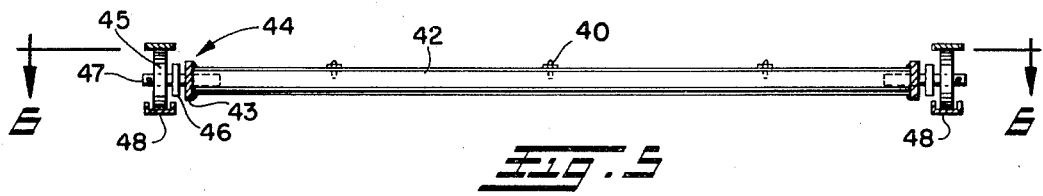
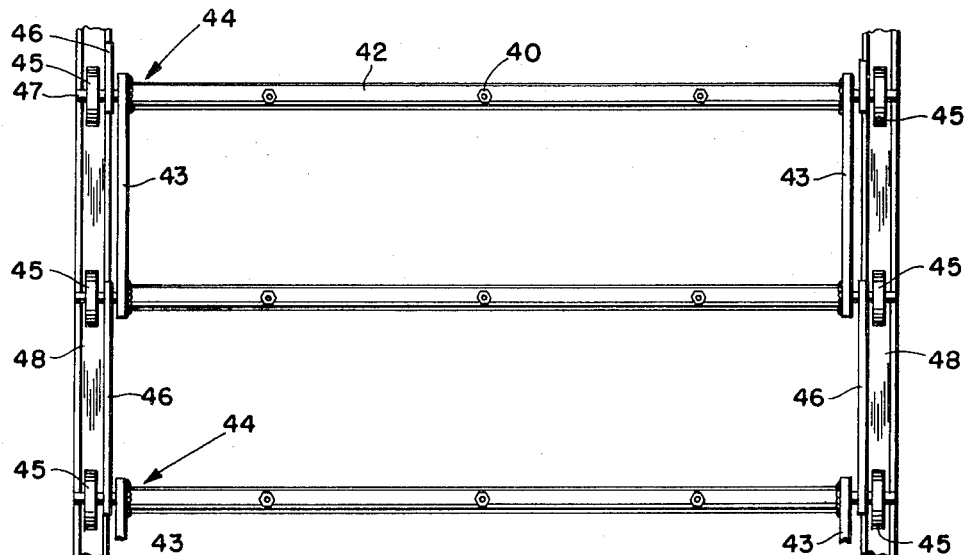
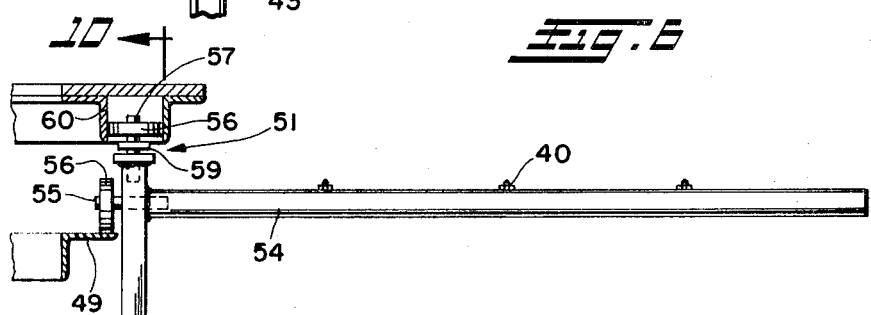
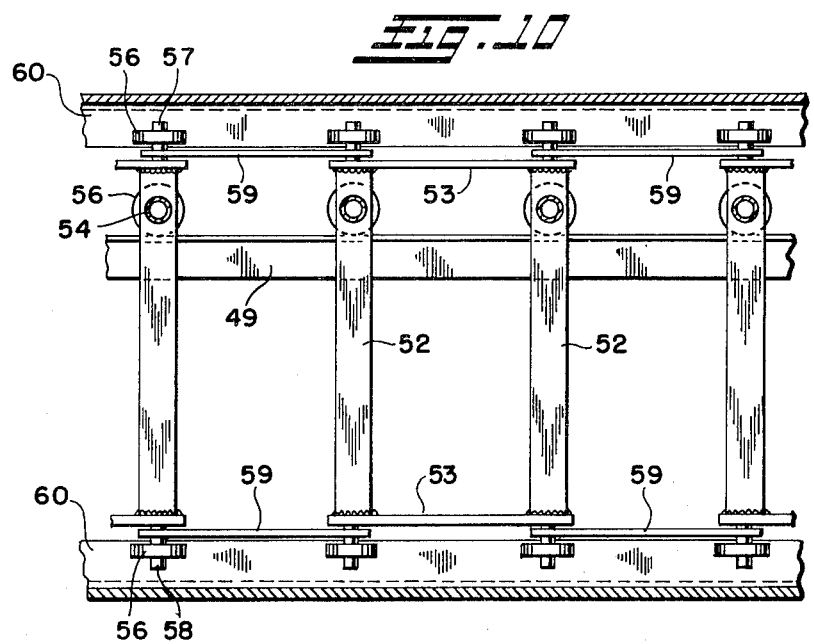

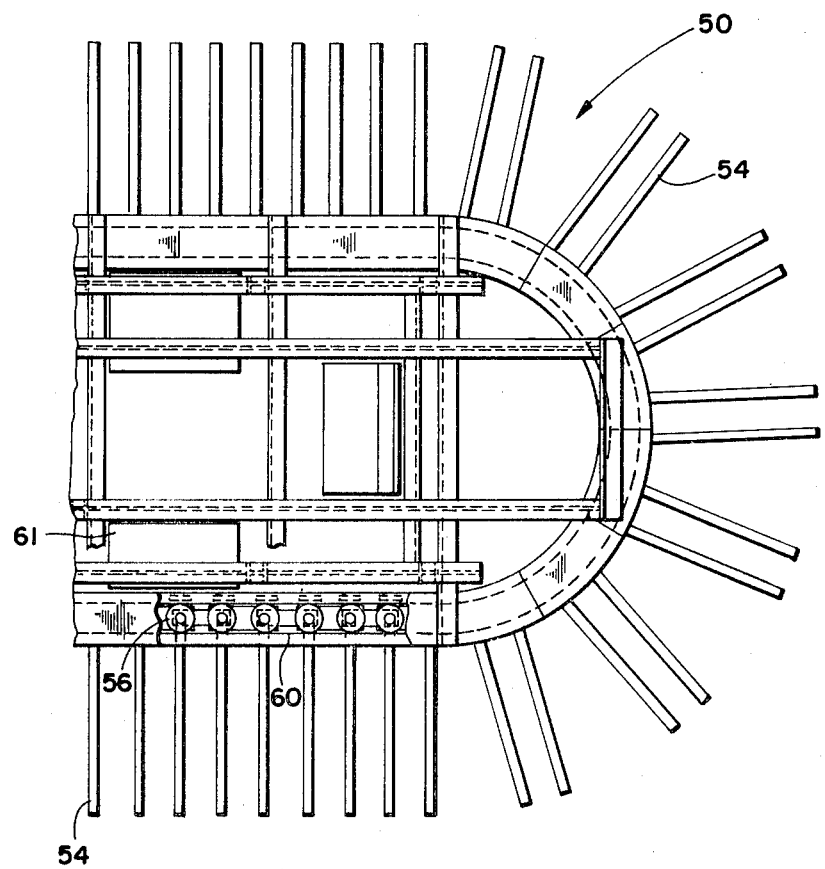
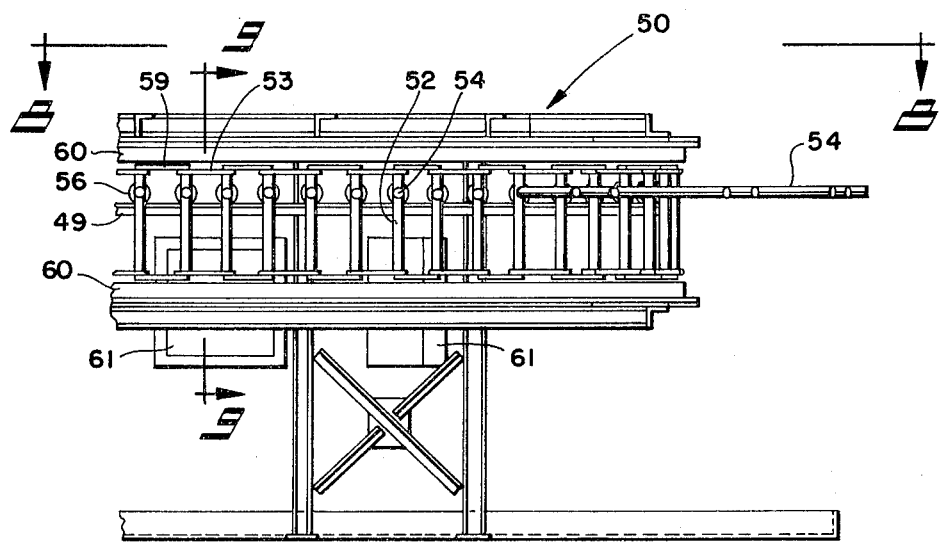

BATCH-OFF STORAGE FESTOON

BACKGROUND OF THE INVENTION

This invention relates generally as indicated to a batch-off storage festoon for receiving hot rubber or other strip material from a batching mill and transporting the rubber material as it is being dried and cooled for deposit on storage pallets and the like.

In processing rubber material from raw material to semi-finished products, a batch of the raw rubber material is first thoroughly mixed with other ingredients and fed to a mill where the rubber material is worked into a sheet of the desired width and thickness. The rubber material coming out of the mill is hot and sticky and must be coated with limestone or other suitable material and dried and cooled prior to storage to prevent layers of the rubber material from adhering together. For that purpose, batch-off machines have been utilized which usually include a take-off conveyor for picking up the material coming off the mill, a dip conveyor for conveying the material through a dip tank where it is covered with a non-sticking material such as talc or limestone, a moving storage festoon for storing and transporting the material during drying and cooling, and a wig-wag conveyor for removing the material from the storage festoon and depositing it on storage pallets and the like for removal to storage rooms. The rubber material coming off a mill is not ordinarily immediately used since the size of a run is usually so large that it sometimes takes several weeks to use.

The present invention is directed to certain improvements in storage festoons. Heretofore, a conventional storage festoon consisted of two standard roller chains placed approximately 36 to 48 inches apart, with bars extending between the chains for supporting loops of the rubber material to be dried and cooled. Since the process is continuous, the chains formed continuous loops so that they could move continuously.

The disadvantage of such prior festoons was that the conventional chain drives usually had to be replaced every two to three years, and the friction developed by such chains was also quite high which restricted the load carrying capacity of the festoons and also required considerable force to drive the racks. Lubrication was also a problem because of the limestone or talc which was used to prevent the rubber from sticking. The limestone or talc was blown everywhere and also acted as an abrasive. In addition, both the original cost and cost of maintaining such equipment was relatively high.

SUMMARY OF THE INVENTION

With the foregoing in mind, it is a principal object of this invention to provide a moving storage festoon which is less costly than the conventional chain-type festoons, and also requires less maintenance.

Another object is to provide such a festoon which has a relatively long trouble-free life.

Still another object is to provide such a festoon which requires very little force to move the racks and has a high load carrying capacity.

Yet another object is to provide such a festoon which positively retains the rubber material against slippage on the racks during drying and cooling while being transported by the festoon.

A further object is to provide such a festoon which may be driven by a pusher-type drive system rather than by chains and sprockets.

These and other objects of the present invention may be achieved utilizing bearings or wheels to support the storage racks for ease of movement along guide rails. The storage racks desirably include two storage bars, and successive storage racks are pivotally connected together by links to provide a continuous loop for movement of the storage racks along continuous loop guide rails. The bearings or wheels may be sealed and pre-lubricated for life and require little or no maintenance. Movement of the storage racks may be obtained using a pusher-type drive system including movable projections engageable with the storage bars to push them along the guide rails. A pressure roll may also be provided for pressing the rubber material against projections on the storage bars thereby preventing slippage of the rubber material during drying and cooling while being transported from one station to another.

BRIEF DESCRIPTION OF THE DRAWINGS

In the annexed drawings:

FIGS. 1A, 1B, and 1C show schematically a batch-off machine including a preferred form of storage festoon constructed in accordance with the present invention;

FIG. 2 is a fragmentary top plan view of the storage festoon shown in FIG. 1B as seen from the plane of the line 2—2 thereof;

FIG. 3 is an enlarged transverse section through the storage festoon of FIG. 1B, taken on the plane of the line 3—3 thereof;

FIG. 4 is a partial side elevation view of the storage festoon of FIG. 3 as seen from the plane of the line 4—4;

FIG. 5 is a transverse section similar to FIG. 3, but showing a modified form of storage festoon in accordance with this invention;

FIG. 6 is a fragmentary vertical section through the storage festoon of FIG. 5 taken on the plane of the line 6—6 thereof;

FIG. 7 is a fragmentary side elevation view of yet another form of storage festoon constructed in accordance with this invention;

FIG. 8 is a fragmentary top plan view of the storage festoon of FIG. 7, as seen from the plane of the line 8—8 thereof;

FIG. 9 is an enlarged fragmentary transverse section through the storage festoon of FIG. 7, taken on the plane of the line 9—9 thereof; and FIG. 10 is a vertical section through the storage festoon shown in FIG. 9, taken on the plane of the line 10—10 thereof.

DESCRIPTION OF THE PREFERRED EMBODIMENTS

Figure 1A:
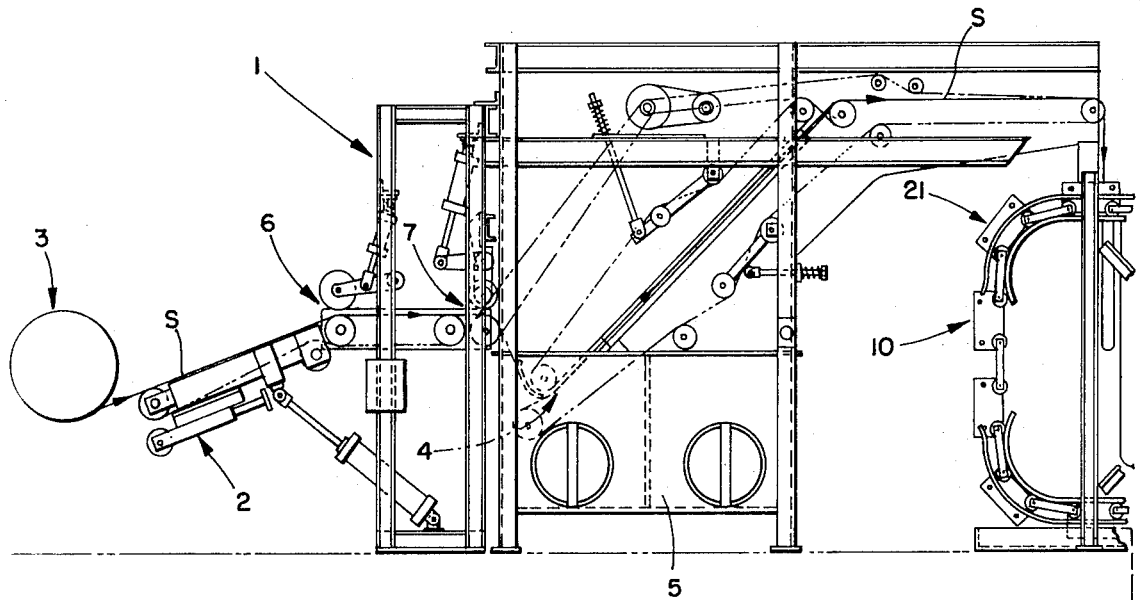
Figure 1B:
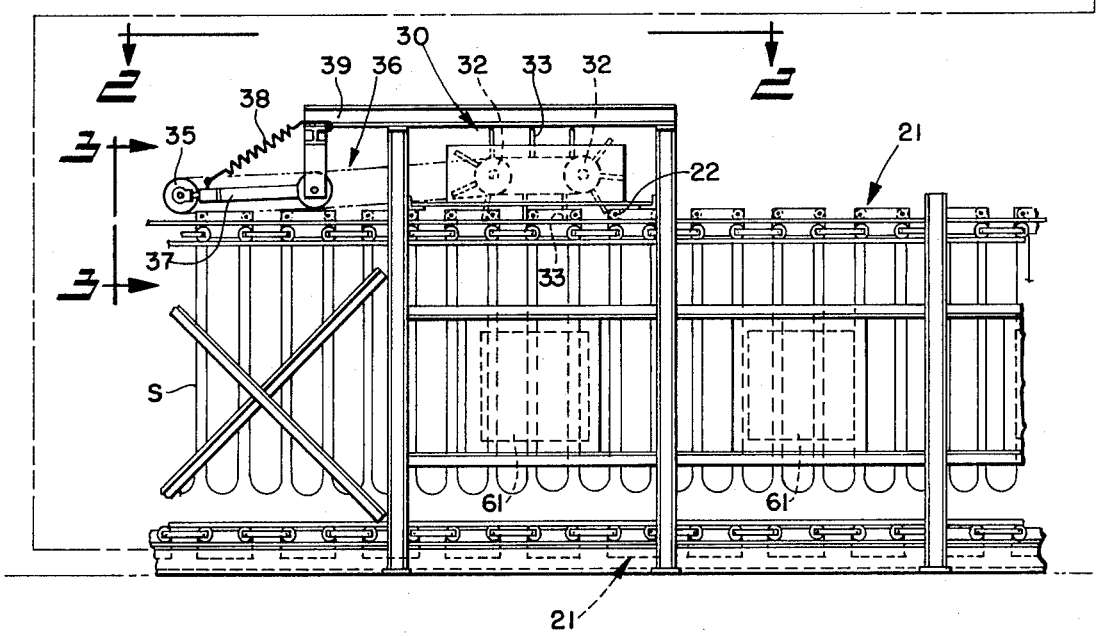

Referring now in detail to the drawings and initially to FIGS. 1A, 1B, and 1C, there is schematically shown a batch-off machine 1 which may be used in the processing of rubber material and the like from raw material to a semi-finished product. At the left-most end of the machine shown in FIG. 1A, a take-off conveyor 2 is provided for taking the hot rubber material S coming off a mill 3 in sheet form of the desired width and thickness. Prior to being fed to the mill, the raw rubber material is placed in a large mixer, not shown, where it is thoroughly mixed with various other ingredients.

The rubber material coming off the mill is hot and sticky and must ordinarily be coated with a non-sticking material such as limestone or talc prior to cooling and storage to prevent layers of the rubber material from adhering together.

To coat the rubber strip material S with a non-sticking material, there is shown a dip conveyor 4 which transports the rubber strip material from the take-off conveyor 3 through a dip tank indicated generally at 5 in FIG. 1A.

Printer rolls 6 may also be interposed between the take-off conveyor 2 and dip conveyor 4 for printing on the rubber strip material, and a splicer 7 may also be provided for splicing the ends of two strips of rubber material together as required. The take-off conveyor 2 may also be pivotally mounted as shown to permit pivoting of the take-off conveyor 2 out of the way for servicing of the rubber mill 3.

From the dip conveyor 4 the rubber strip material S is desirably deposited onto a preferred form of storage festoon 10 in accordance with this invention, the details of which will be described hereafter. The strip material S is deposited in loops at one end of the storage festoon 10 and transported thereby to permit drying and cooling of the rubber material during movement therealong. When the rubber strip material reaches the other end, it is withdrawn from the storage festoon 10 and may either be fed onto a wig-wag conveyor 11 having a pair of pivoted guides 12, 13 at the right-most end thereof for pivoting back and forth to deposit the rubber strip material in layers on a storage pallet P placed therebeneath as schematically shown in FIG. 1C, or deposited on an inclined conveyor 14 for passage between a rotary shear 15 where the rubber strip material is cut in desired lengths and subsequently deposited on the storage pallet P as further shown in FIG. 1C. The storage pallet P may be positioned on a spring-supported platform 16 so that as the weight of the strip material S deposited on the pallet increases, the pallet P continues to move downwardly against the force of the spring 17 to maintain the upper level of the rubber strip material being deposited on the pallet in substantially the same plane. When the pallet P is fully loaded, it is replaced with an empty pallet and the full pallet may be removed to a storage room.

Referring further to FIGS. 1A, 1B, and 1C, and also to FIGS. 2 through 4, the details of construction and operation of the storage festoon 10 illustrated therein will now be described. As shown, the main support frame 18 for the storage festoon 10 has mounted thereon two pairs of horizontally extending, vertically spaced guide rails 19, 20 which provide a guide track for guiding the movements of a multitude of storage racks 21 pivotally connected together to form a continuous loop. As best seen in FIGS. 3 and 4, each storage rack 21 desirably includes a pair of spaced apart transversely extending storage bars 22 cantilevered from one end by attachment to a pair of spaced support plates 23, 24 running parallel to the guide rails 19, 20. The storage racks 21 are supported for movement along the guide rails 19, 20 by bearings or wheels 25 suitably journaled on the ends of a pair of shafts 26, 27 extending between the support plates of each storage rack.

Successive storage racks 21 are also pivotally connected together to permit movement of the storage racks in a continuous loop using links 28 extending between adjacent ends of successive storage racks 21 with the ends of the links 28 suitably journaled on the ends of the bearing shafts 26, 27. As will be appreciated, the spacing between successive storage racks 21 may be varied by varying the lengths of the links 28 therebetween, and the spacing between the storage bars 22 may also be varied as desired. Moreover, while two storage bars per rack are preferred, it will be appreciated that three or more storage bars may be provided on each storage rack depending on the configuration of the storage racks.

The original cost of such storage racks 21 is less than the storage racks used on a conventional chain-type festoon, and the maintenance cost is also less. There is also very little wear on the bearings or wheels supporting the racks, resulting in substantially longer life, and such bearings or wheels may also be sealed and pre-lubricated for life thereby eliminating the problems attendant with lubricating a conventional chain-type festoon. Moreover, because of the extremely high efficiency of such bearings or wheels, very little force is required to move the storage racks, and such storage racks may be designed for a relatively high load factor. Cover members 29 desirably extend over the other side of the bearings or wheels 25 in spaced relation to the guide rails.

To obtain movement of the storage racks 21 along the guide rails 19, 20, there is desirably provided a pusher-type drive mechanism 30 which as shown in FIGS. 1B and 2 desirably includes a main drive chain 31 in the form of a continuous loop extending around a pair of spaced apart sprockets 32 located above the upper run of storage racks. The chain 31 extends over several of the storage bars 21 and has a plurality of spaced apart pins or rods 33 projecting therefrom. The spacing of the pins 33 substantially corresponds to the spacing between the storage bars, whereby when the main drive chain 31 is driven by a drive motor 34 suitably connected to one of the sprockets 32, the pins 33 will engage the storage bars between the support plates 23, 24 causing the storage racks 21 to move along the guide rails 19, 20.

The rate of travel of the storage racks 21 along the guide rails 19, 20 is somewhat slower than the rate at which the rubber strip material S is deposited onto the storage bars 22 by the dip conveyor 4 whereby the rubber strip material forms loops over the storage bars as best seen in FIGS. 1A and 1B. A pressure roll 35 is also desirably mounted above the top run of storage racks 21 for engagement with the storage bars 22 after placement of the loops of rubber strip material thereon to press the rubber strip material against the storage bars to prevent slippage. The pressure roll 35 may be driven by a chain drive 36 off the same motor 34 used to drive the chain 31 and is mounted between the ends of a pair of pivotally mounted arms 37 so that the weight of the roll presses against the storage bars. The pressure roll 35 is prevented from falling between the storage bars 22 by a spring 38 which connects the arms 37 to a fixed support 39. Set screws or other suitable projections 40 may also project upwardly from the storage bars 22 to provide a more effective grip with the rubber strip material folded thereover, and the pressure roll 35 may also be appropriately grooved at 41 to accommodate the projections on the storage bars 22 as shown, for example, in FIG. 3.

While in the preferred form of the invention shown in FIGS. 1 through 4 the storage bars 21 are cantilevered from one end, it will be appreciated that the storage bars 42 may be supported at both ends by attaching support plates 43 to opposite ends of the storage bars of each storage rack 44 and suitably journaling the bearings or wheels 45 and connecting links 46 to the ends of the storage bars as by providing stub shafts 47 thereon as shown in FIGS. 5 and 6. Of course, the spacing between the guide rails 48 must be increased to correspond with the spacing between the bearings or wheels 45.

It will also be appreciated that the guide rails 49, rather than extending in a vertical loop as in the FIGS. 1 through 6 embodiments, could just as well extend in a horizontal loop as further shown in the horizontal or merry-go-round type storage festoon 50 of FIGS. 7 through 10. Preferably, the storage racks 51 of the FIGS. 7 through 10 embodiment consist of a pair of vertically extending plates 52 rigidly connected together at opposite ends by a pair of additional plates 53 welded to the ends thereof as shown in FIGS. 9 and 10. A storage bar 54 is secured to one side of each of the vertical plates 52 intermediate the ends thereof, and a stub shaft 55 projects from the other side of the vertical plates 52 opposite the storage bars to provide a suitable bearing mount for a bearing or wheel 56 engageable with the horizontal guide rail 49. Additional stub shafts 57 and 58 project from opposite ends of each vertical plate 52 for journaling of additional bearings or wheels 56 and connecting links 59 to the ends of the vertical plates. The ends of the connecting links 59 are pivotally connected to the adjacent ends of successive storage racks 51 as shown in FIGS. 9 and 10, and the bearings or wheels 56 on opposite ends of the vertical plates are received between vertical guides 60 to provide the necessary support for the storage racks during movement along the horizontal looped guide rails.

If desired, additional storage capacity may be provided on the various storage festoons of the present invention to store additional strip material during periods when the take-off conveyor 11 or 14 is not in operation by extending the storage festoon beyond the normal discharge point P of the storage festoon 10 as shown, for example, in FIG. 1C. To store additional strip material on the storage festoon 10, the storage racks 21 are continuously advanced along the guide rails 19 at the same rate of speed as before, and the strip material S is left on the storage racks 21 beyond the normal discharge point P.

To remove the strip material which has accumulated on the storage festoon beyond the normal withdrawal point P, the take-off conveyor 11 or 14 must be run faster than the feed conveyor 4 which deposits the strip material on the storage festoon for a period of time until the pay-out end of the strip material is once again located at the normal discharge point P.

A guide roll 62 is desirably mounted on a platform 63 for movement above the storage racks 21 to assist in accumulating the strip material on the storage festoon beyond the normal discharge point P and also in the subsequent removal of the accumulated material. The platform 63 may be supported by rollers 64 for movement along additional guide rails 65 above the guide rails 19 for the storage racks 21. During normal operation, the platform 63 may be held stationary with the guide roll 62 located at the normal discharge point P for engagement by the strip material during withdrawal from the storage festoon. However, when withdrawal of the strip material from the storage festoon is interrupted, the platform 63 is caused to move at the same rate of speed as the storage racks 21 as by actuation of a magnetic clutch 66 which engages one of the storage racks for movement therewith thus to maintain the guide roll 62 in contact with the pay-out end of the strip material during accumulation of the strip material on the storage racks beyond the normal discharge point P as shown in phantom lines in FIG. 1C.

During removal of the accumulated material from the storage racks 21 beyond the normal discharge point P, the magnetic clutch 66 is actuated to disengage the platform 63 from the storage racks and the platform 63 is caused to move back toward the normal discharge point P as by actuation of a variable speed drive motor 67 and suitable sprocket and chain drive mechanism 68 at a rate which maintains the guide roll 62 in contact with the pay-off end of the strip material at its point of withdrawal from the storage racks.

From the foregoing, it will now be apparent that the various storage festoons of the present invention are of a relatively simple and inexpensive design which require less maintenance than previous known chain-type storage festoons and also have a longer life. In addition, less force is required to operate the storage festoons of the present invention, and the storage racks are designed for a high load factor. Moreover, because of the positive manner in which such storage racks are guided, they are always maintained in proper alignment with each other, and they may also be driven by a pusher-type drive mechanism instead of a conventional chain and sprocket drive. Cooling fans 61 shown schematically in FIGS. 1B, 7, and 8 may also be placed where desired to obtain maximum cooling efficiency of the rubber strip material while being transported by the storage festoon.

The embodiments of the invention in which an exclusive property or privilege is claimed are defined as follows:

1. A storage festoon apparatus comprising a plurality of storage racks, links pivotally connecting successive ones of said storage racks together to form a continuous loop, guide rails providing a continuous looped path for said storage racks, said storage racks being supported by bearings on said guide rails, and means for moving said storage racks in a continuous loop along said guide rails, said guide rails providing a vertical loop for movement of said storage racks in a vertical looped path, said storage racks including two support plates, and two storage bars supported by said support plates, said links being pivotally connected to the sides of the support plates of successive storage racks.

2. The apparatus of claim 1 wherein said storage bars are cantilevered at one end from said support plates, and said bearings and links are journaled on shafts extending between said support plates of each storage rack.

3. The apparatus of claim 1 wherein said support plates are connected to the ends of said storage bars of each of said storage racks, and stub shafts project from the ends of said storage bars, said bearings and links being journaled on said stub shafts.

4. A storage festoon apparatus comprising a plurality of storage racks, links pivotally connecting successive ones of said storage racks together to form a continuous loop, guide rails providing a continuous looped path for said storage racks, said storage racks being supported by bearings on said guide rails, and means for moving said storage racks in a continuous loop along said guide rails, said guide rails providing a horizontal loop for movement of said storage racks in a horizontal looped path, said storage racks including vertical plates, storage bars cantilevered at one end from one side of said vertical plates, stub shafts extending from the other side of said vertical plates, said bearings being journaled on said stub shafts, additional stub shafts projecting from the upper and lower ends of said vertical plates, said links being journaled on the ends of said additional stub shafts, and additional bearings journaled on said additional stub shafts, said additional bearings being received between vertical guides to provide support for said storage racks during movement along said guide rails.

5. A storage festoon apparatus comprising a plurality of storage racks, links pivotally connecting successive ones of said storage racks together to form a continuous loop, guide rails providing a continuous looped path for said storage racks, said storage racks being supported by bearings on said guide rails, and means for moving said storage racks in a continuous loop along said guide rails, said storage racks including storage bars for looping of strip material thereover, and a pressure roll is mounted for engagement with the top of said storage bars to press the strip material against said storage bars to prevent slippage, means mounting said pressure roll for pivotal movement against the top of said storage bars, and spring means preventing said pressure roll from falling between said storage bars.

6. A storage festoon apparatus comprising a plurality of storage racks, links pivotally connecting successive ones of said storage racks together to form a continuous loop, guide rails providing a continuous looped path for said storage racks, said storage racks being supported by bearings on said guide rails, and means for moving said storage racks in a continuous loop along said guide rails, said storage racks including storage bars for supporting strip material thereon, and said means for moving said storage racks in a continuous loop along said guide rails comprising a pusher-type drive mechanism including a main drive chain, a pair of spaced sprockets located above said storage bars, said main drive chain extending around said sprockets in a continuous loop above several of said storage bars, plural spaced apart pins projecting outwardly from said main drive chain, the spacing between said pins substantially corresponding to the spacing between said storage bars, and means for driving said main drive chain to cause said pins to engage said storage bars and move said storage racks along said guide rails.

7. The apparatus of claim 6 further comprising a pressure roll mounted for engagement with the tops of said storage bars to press the strip material against said storage bars to prevent slippage, and means for driving said pressure roll off the same drive for said main drive chain.

8. A storage festoon apparatus comprising a plurality of storage racks, links pivotally connecting successive ones of said storage racks together to form a continuous loop, guide rails providing a continuous looped path for said storage racks, said storage racks being supported by bearings on said guide rails, and means for moving said storage racks in a continuous loop along said guide rails, and a discharge conveyor for removing strip material from said storage racks, said guide rails for said storage racks extending beyond the point of discharge of the strip material from said storage racks onto said discharge conveyor to provide for storage of additional strip material on said storage racks beyond such discharge point during periods when said discharge conveyor is not in operation.

9. The apparatus of claim 8 further comprising a platform mounted for movement above said storage racks, said platform having a guide roll thereon engageable by the strip material during discharge from said storage racks, means for advancing said platform at the same rate of speed as said storage racks during periods when said discharge conveyor is not in operation for maintaining said guide roll in contact with the strip material during accumulation of the strip material on said storage racks beyond said discharge point, means for driving said discharge conveyor at a rate to remove the accumulated strip material beyond said discharge point from said storage racks, and means for returning said platform to its original position at a rate which corresponds to the rate of removal of the accumulated material from said storage racks.

10. A storage festoon apparatus comprising a plurality of storage racks, links pivotally connecting successive ones of said storage racks together to form a continuous loop, guide rails providing a continuous looped path for said storage racks, said storage racks being supported by bearings on said guide rails, and means for moving said storage racks in a continuous loop along said guide rails, each of said storage racks including common support means for at least two storage bars for supporting strip material looped over said storage bars, said links being pivotally connected at opposite ends to successive storage racks.

11. The apparatus of claim 10 wherein said each of said common support means includes a pair of support plates for supporting said storage bars.

12. The apparatus of claim 10 wherein said each of said common support means includes support plates, said storage bars being cantilevered at one end from said support plates.

13. The apparatus of claim 10 wherein said guide rails provide a vertical loop for movement of said storage racks in a vertical looped path.

14. The apparatus of claim 10 wherein said guide rails provide a horizontal loop for movement of said storage racks in a horizontal looped path.

15. The apparatus of claim 10 wherein said storage bars have projections extending upwardly therefrom to provide an effective grip with the strip material looped thereover.

16. The apparatus of claim 15 further comprising a pressure roll mounted for engagement with the top of said storage bars to press the strip material against said storage bars to prevent slippage, said pressure roll being grooved to accommodate said projections on said storage bars.

* * * * *